United States Patent [19]
Wang

[11] Patent Number: 5,863,491
[45] Date of Patent: Jan. 26, 1999

[54] PHOTOCATALYTIC REACTOR FOR METAL RECOVERY FROM INDUSTRIAL WASTE STREAMS

[76] Inventor: Chi S. Wang, 5923 Fairmont, Woodridge, Ill. 60517

[21] Appl. No.: 790,725

[22] Filed: Jan. 31, 1997

[51] Int. Cl.$^6$ ..................................................... C22B 3/00
[52] U.S. Cl. ........................................... 266/101; 266/170
[58] Field of Search .................................... 266/101, 170; 210/747, 748

[56] References Cited

U.S. PATENT DOCUMENTS

| | | | |
|---|---|---|---|
| 2,472,490 | 6/1949 | Planck | 252/432 |
| 3,549,524 | 12/1970 | Haller | 210/31 |
| 3,758,284 | 9/1973 | Haller | 65/31 |
| 3,843,341 | 10/1974 | Hammel et al. | 65/22 |
| 5,137,607 | 8/1992 | Anderson et al. | 204/59 |
| 5,194,161 | 3/1993 | Heller et al. | 210/748 |
| 5,449,466 | 9/1995 | Peebles, III et al. | 210/748 |
| 5,462,674 | 10/1995 | Butters et al. | 210/748 |
| 5,683,589 | 11/1997 | De Lasa et al. | 210/748 |
| 5,736,055 | 4/1998 | Cooper | 210/748 |

OTHER PUBLICATIONS

Kokubu, T, and M. Yamane,*Preparation of Porous Glass--Ceramics of the $TiO_2$–$SiO_2$ System*, Journal of Materials Science 20, 4309 Dec. (1985).

Mukherjee, S.P., Deposition of Transparent Noncrystalline Metal Oxide Coatings by the Sol–Gel Process, Chap. 14, *Ultrastructure of Ceramics, Glasses, and Composites.* Hench, L.L. and D.R. Ulrich, Eds., John Wiley and Sons, New York, Dec. (1984).

*Primary Examiner*—Scott Kastler
*Attorney, Agent, or Firm*—Philip H. Kier

[57] ABSTRACT

A photocatalytic reactor to recover precious metals, useful metals, and toxic metals from industrial waste streams using visible or ultraviolet light and semiconductor material as the photocatalyst. Seeds of metal in the same metal group as the metals being recovered are implanted in the reactor to create nucleation sites for the deposition, agglomeration, and growth of the metals being recovered. The reactor may have internally reflective surfaces to effectively multiply the light sources. The input waste stream may be mixed with reaction acceptor materials that reduce electron-hole recombination and that increase reaction rates.

19 Claims, 9 Drawing Sheets

PHOTOCATALYTIC REACTOR FOR METAL RECOVERY FROM INDUSTRIAL WASTE STREAMS

BACKGROUND OF THE INVENTION

The present invention relates to the use of photocatalysis, and more particularly to the use of a photocatalytic reactor to remove metals from industrial waste streams.

Using semiconductors, such as titanium dioxide ($TiO_2$), as a catalyst when activated by light, especially ultraviolet light, is an effective advanced oxidation process that is sometimes known as photocatalysis. A semi-conductive material has a valence band filled with electrons and an empty conductive band. When semiconductors with an appropriate energy difference between the two bands are irradiated by light, electrons in the valence bands are excited to the conductive bands leaving holes behind (for $TiO_2$ ultraviolet light will excite electrons to transfer to the conductive bands). The holes thus created can extract electrons from surrounding chemical species to form free radicals, which are strong oxidants giving photocatalytic processes the potential for fast and complete organic destruction or metal recovery. Photocatalysis is capable of destroying a wide variety of hazardous organic contaminants, such as polyaromatic hydrocarbons, and many pesticides, and is capable of recovering many metals, such as silver, gold, copper, mercury, platinum, from waste streams.

There is increasing interest in using titanium dioxide activated by ultraviolet light to recover metals in a number of applications, such as the recovery of silver from photography processing wastes. However, there are several drawbacks in the use of titanium dioxide in colloidal form in photocatalysis for metal recovery. It is difficult to separate the recovered metal from the titanium dioxide slurry; there is low efficiency or quantum yield of the photo nucleation, deposition and growth of the metal at its reaction site; free radicals scavengers and electron-hole recombination reduce efficiency; and high concentrations of colloidal suspensions create shadow effects which reduce light intensity.

Some of the difficulties of using colloidal titanium dioxide have been relieved by the use of porous $TiO_2$-$SiO_2$ glass-ceramic semiconductor material or low-reflectivity, porous, metal oxide coatings. For example, separation is easier than from a slurry. Several methods for making such a porous glass-ceramic have been developed. One method that uses heat treatment and subsequent acid leaching is taught by Kokura and Yamane in *Preparation of porous Glass-Ceramics of the $TiO_2$ System*, Journal of Material Science 20, 4309 (1985). This method results in $TiO_2$ being imbedded on a porous $SiO_2$ skeleton. Methods of depositing transparent metal oxide coatings are discussed by S. P. Mukherjee in *Ultrastructure of Ceramics, Glasses, and Composites*, Hench, L. L. and D. R. Ulrich Eds., John Wiley and Sons, New York, 1984. The use of porous glass-ceramic membranes in a reaction vessel for photocatalytic reactions is taught in U.S. Pat. No. 5,137,607.

BRIEF SUMMARY OF THE INVENTION

The present invention is a reactor that uses photocatalytic reactions to recover metals from industrial waste streams. The reactor has a reaction chamber and light sources external to the reaction chamber. The reaction chamber contains porous plates of semiconductive glass-ceramic (porous photocatalytic semiconductor plates) or a slurry or small granules of semiconductive material. The use of porous plates, in which nonporous semiconductor material is imbedded in a porous $SiO_2$ skeleton reduces shadowing and allows the waste stream as well as light to penetrate the catalytic plates. Thus, one object of the present invention is to reduce shadowing and improve penetration of the waste stream into the catalytic material.

If the reaction chamber contains the slurry or granules, it also contains a number of net meshes. Seeds of the metals in the same metal group of the periodic table as the metals to be recovered from the waste stream are deposited or implanted on either the porous photocatalytic semiconductor plates or the net meshes. Without seed metal, nucleated metal crystallites are enriched by photoproduced electrons. Consequently, they could be sites for cathodic-like reduction of cations which would progressively increase their size. These seeds act as deposition sites for the metals intended for recovery and promote nucleation and growth conditions for these metals. Thus, another object of the present invention to promote the deposition, agglomeration, and growth of the metals being recovered through the use of seed metal deposits.

The photocatalysis process includes a step of reducing metal ions to metals through interaction with electrons. However, this reaction is in competition with recombination of the electrons with excess holes. The present invention includes mixing the waste stream with acceptor materials, such as hydrogen peroxide, that react with holes. Thus another object of the present invention is to reduce electron-hole recombination through the introduction of acceptor materials.

The present invention includes having the interior walls of the reactor being reflective or having the reactor encased in a reflective polyhedron. Thus still another object of the present invention is to reflect light that would otherwise be lost into the reaction chamber to improve utilization of light sources.

DETAILED DESCRIPTION OF THE INVENTION

There are three basic preferred embodiments of the instant photocatalytic reactor. In each embodiments a metal-laden waste stream 10 may be pretreated by filtering out large particles or trash, may have its pH adjusted to improve reaction rates, or may be diluted prior to entering the reactor 18 through inlet means 12, which may be a pipe. The waste stream is directed to a reaction chamber 17 with walls 204 that are transparent to light.

The waste stream is mixed with acceptor material 4 (such as $H_2O_2$, $O_3$, or $O_2$) upon entering the reactor through pipe 3. These acceptor materials react with excess holes and consequently reduce electron-holes recombination.

Figure 1:
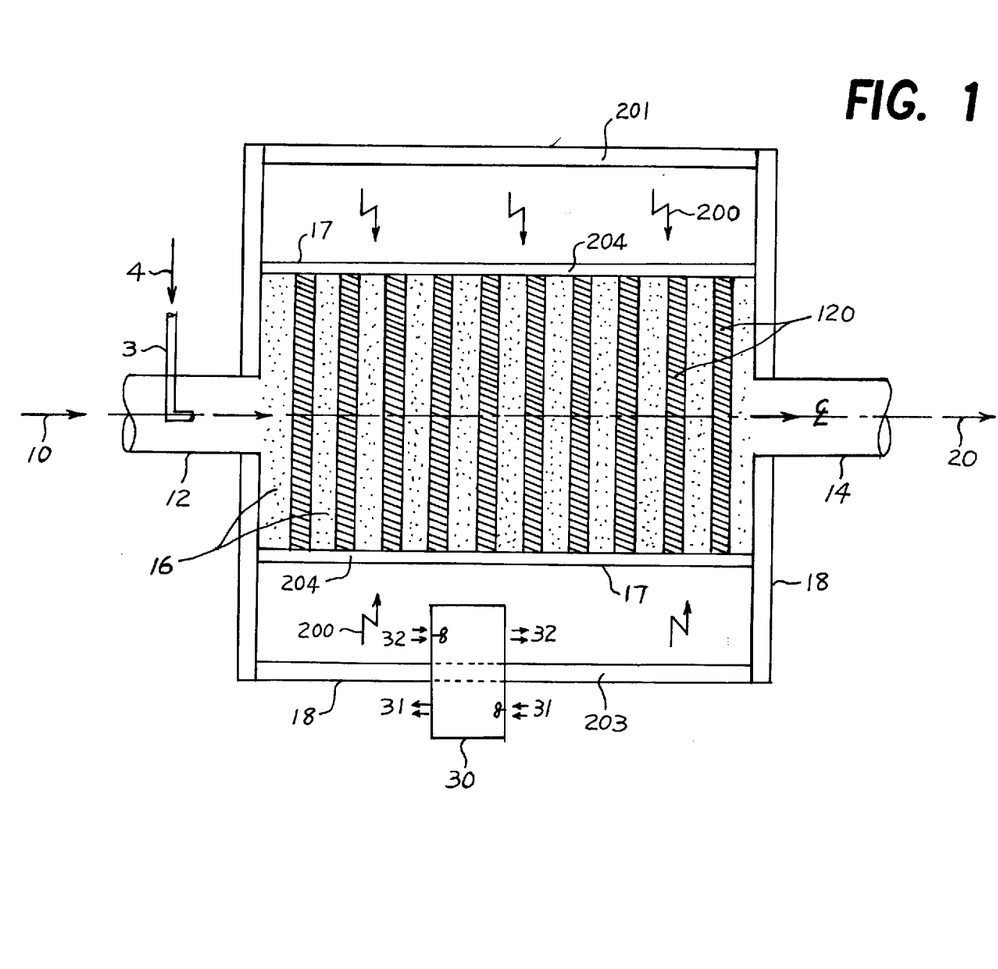
FIG. 1 is a side view of an embodiment of the reactor that uses photocatalytic semiconductor material in a slurry or granular form.
Figure 4A:
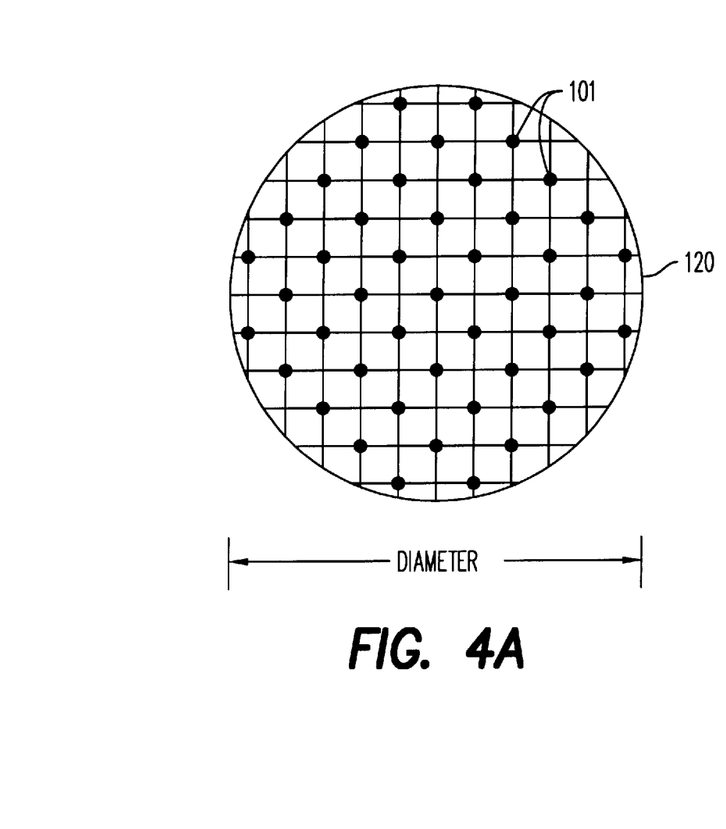
FIG. 4a and FIG. 4b are side views of two shapes of net meshes used in the embodiment that uses photocatalytic semiconductor material in a slurry or granular form.
Figure 4B:
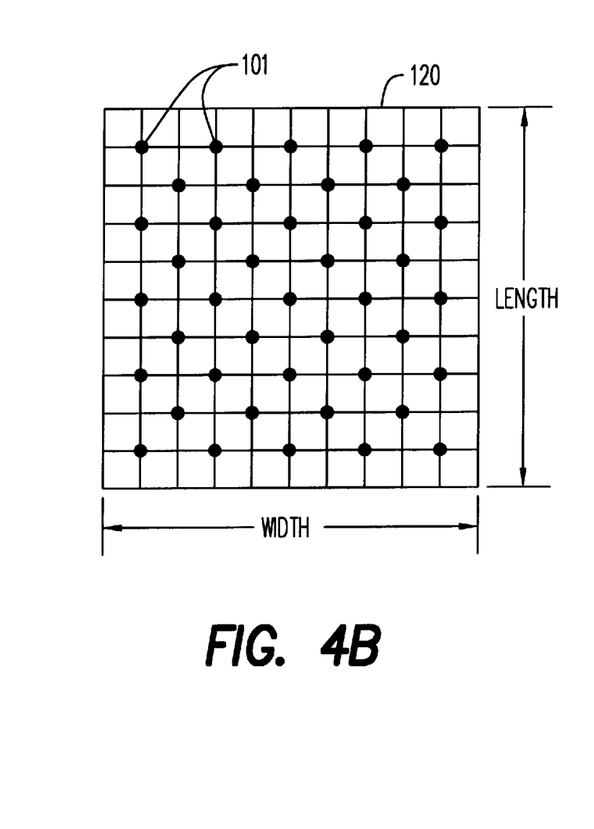

In the embodiment shown in FIG. 1, the reactor has a reaction chamber 17 that contains semiconductor material 16, such as titanium dioxide ($TiO_2$), cadmium sulfate (CdS), tungsten oxide ($WO_3$), zinc oxide (ZnO), in a nonporous slurry form or as porous semiconductor-$SiO_2$ granules. Spaced within the semiconductor material and perpendicular to the direction of flow of the waste flow are net meshes 120, which should be made of an electrically conductive metal such as stainless steel. As shown in FIG. 4, seeds of the metal to be recovered 101 are implanted on the net meshes. On the walls of the reactor are one or more light sources 201 and where there are not light sources, the walls could be coated with reflecting material 203 to fully utilize the light sources from different angles without adding more light sources. As an alternative to light sources 201, a wall of the reactor may be transparent and admit solar light into the reactor. If the semiconductor material is a metal oxide such as $TiO_2$, then the light sources should have frequencies in the ultraviolet (UV) range.

Figure 2:
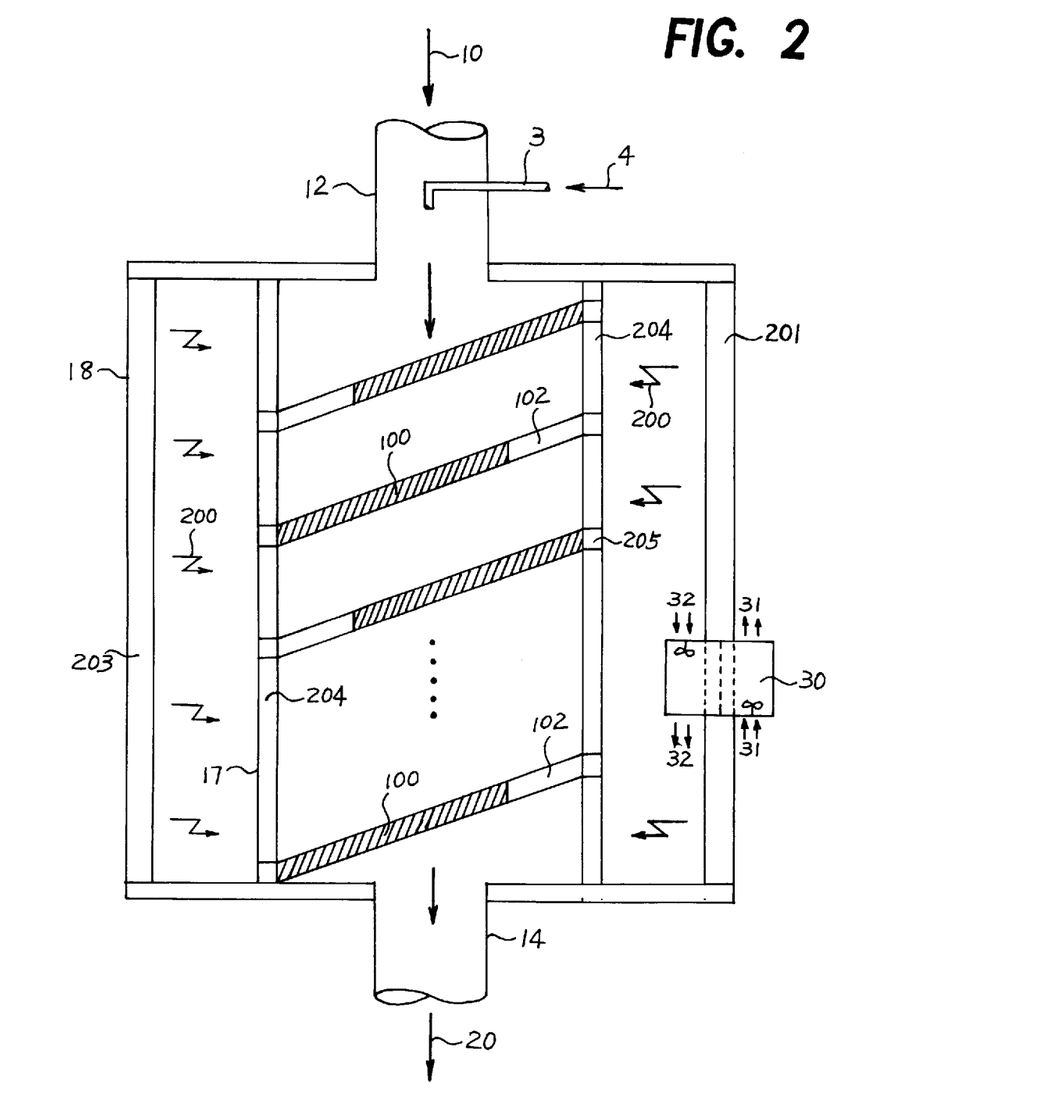
FIG. 2 is a side view of an embodiment of the reactor that uses porous plates of photocatalytic semiconductor material.
Figure 3A:
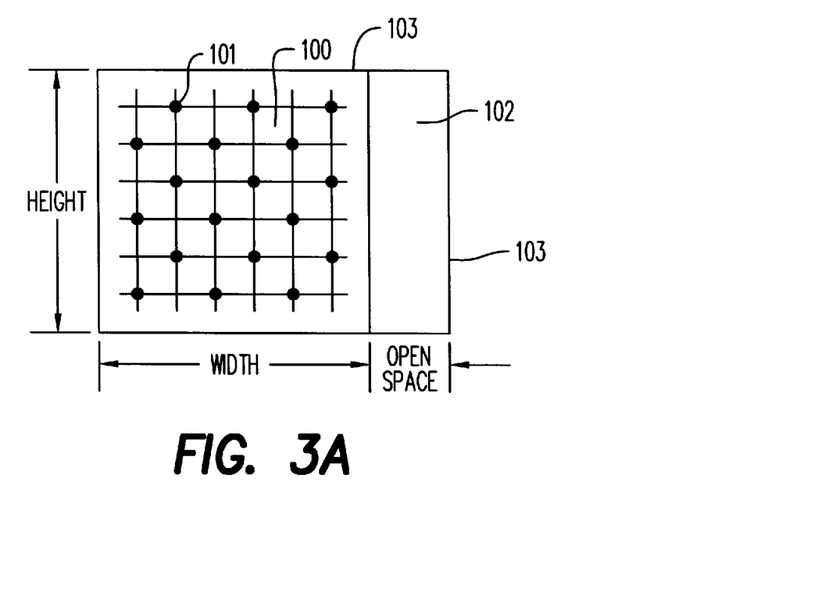
FIG. 3a and FIG. 3b are perspective views of a rectangular porous photocatalytic semiconductor plate.
Figure 3B:
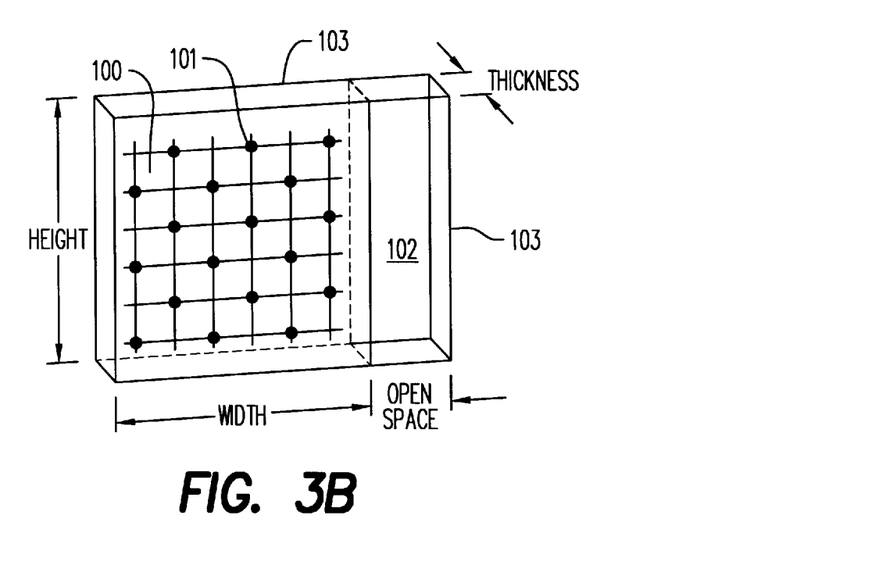

The preferred embodiment shown in FIG. 2 has a plurality of porous photocatalytic semiconductor plates 100 in the reaction chamber 17. These plates typically contain porous $TiO_2$-$SiO_2$ and as shown in FIG. 3 have seeds 101 of the metal to be recovered, or seeds of a metal in the same metal group in the periodic table of the elements as the metal to be recovered. The preferred seed metal is, however, the same metal as being recovered. A porous photocatalytic semiconductor plate 100 is contained within a frame 103, but does not completely occupy the frame so that there is some open space 102. As shown in FIG. 2, the porous photocatalytic semiconductor plates are placed in a slot fixture 205 such that they have an incline with the slot fixture and the direction of the flow of the waste stream. As in the other basis embodiment, there are light sources 201 and reflective material 203 on the walls of the reactor other than the walls through which the waste steam enters and exits. Having the porous photocatalytic semiconductor plates at an incline allows the light 200 to impinge directly on them. The porous photocatalytic semiconductor plates 100 could be thin and brittle and therefore should be guarded against pressure buildup. The function of open space 102 contained within frame 103 is to relieve any pressure buildup. The location of the open space within the frame alternates in neighboring frames relative to the porous photocatalytic semiconductor plate so that all of the incoming waste stream 10 will contact a porous photocatalytic semiconductor plate and react with it.

A high temperature is not needed nor wanted for photocatalysis. To remove heat generated by the light sources or by electron-hole recombination reactions, a cooling means 30 is installed in a wall 201 or 203 of the reactor. A heat pipe type of cooling means is preferred because it removes heat from within the reactor to the atmosphere and provides a gas-tight condition without mixing of atmospheric air 31 with toxic gases 32 that potentially might be leaking with the reaction chamber. The reaction products 20 exits from the reaction chamber through an outlet means 14, such as a pipe.

Figure 5A:
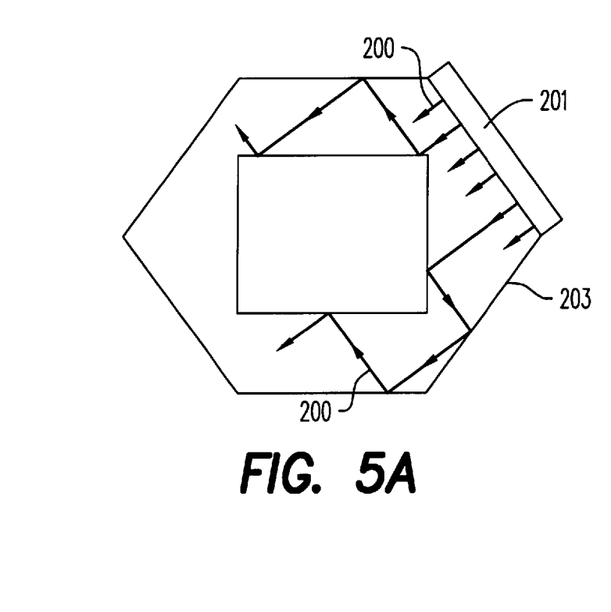
FIG. 5a and FIG. 5b are perspective views of a polyhedron reflector surrounding the reactor.
Figure 5B:
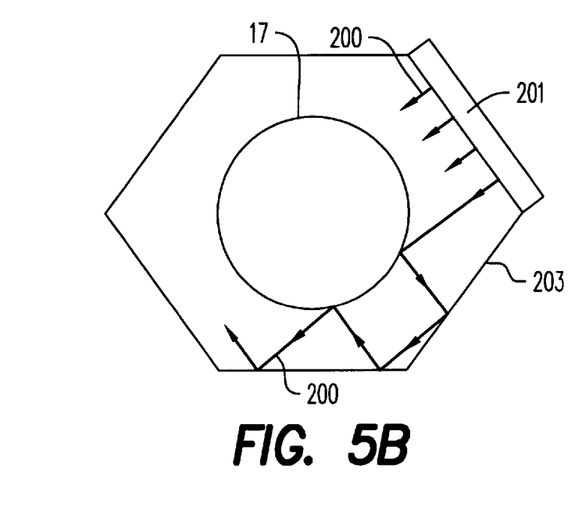

FIG. 5 shows an embodiment of the reactor 18 for which a reaction chamber 17 is contained within a polyhedron with reflective surfaces 203 and with one surface that has light sources 201. That one surface alternatively could have transparent walls to admit solar light. The polyhedron would have six or more sides to maximize the reflection of light that is not initially absorbed by the semiconductor material back into the reaction chamber where it can ultimately be absorbed. The use of a reactor in the shape of such a polyhedron reduces light losses from the reactor. The walls of the polyhedron can have a diffuse or a spectral surface. Both types of surfaces are capable of reflecting light.

Figure 6:
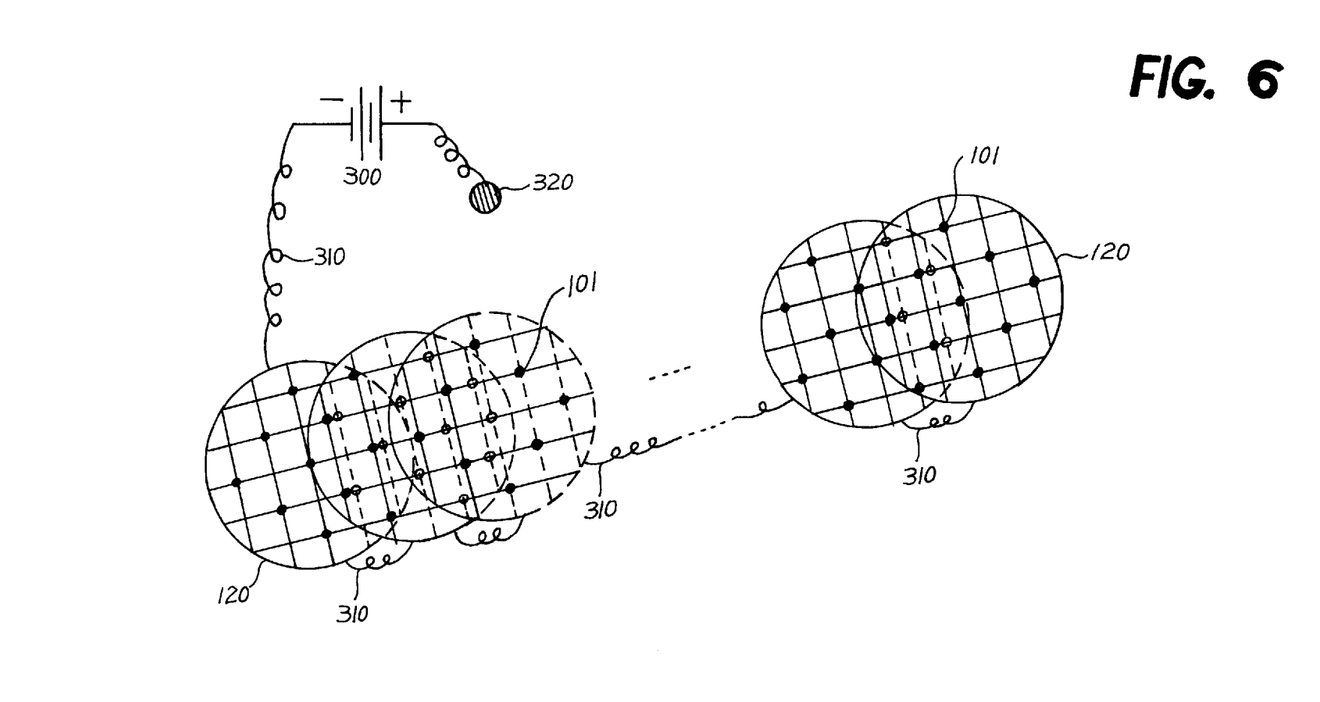
FIG. 6 is a schematic view of circular porous photocatalytic semiconductor plates attached to an external energy source.

Recombination of holes and electrons can reduce the efficiency of the reactor. Recombination can be reduced by migration of excess holes or electrons from the reaction chamber. In FIG. 6, the porous photocatalytic semiconductor plates or net meshes are connected in series using electrical wires 310 to an external electric potential 300. The electric potential is also connected to an anode electrode 320 that is located within the reaction chamber to be in the path of the waste stream. The electric potential and anode not only reduce hole-electron recombination by causing migration of holes or electrons but also promote cathodic-like reduction of metal ions (cations) to elemental metal. Both effects increase recovery efficiency.

Figure 7:
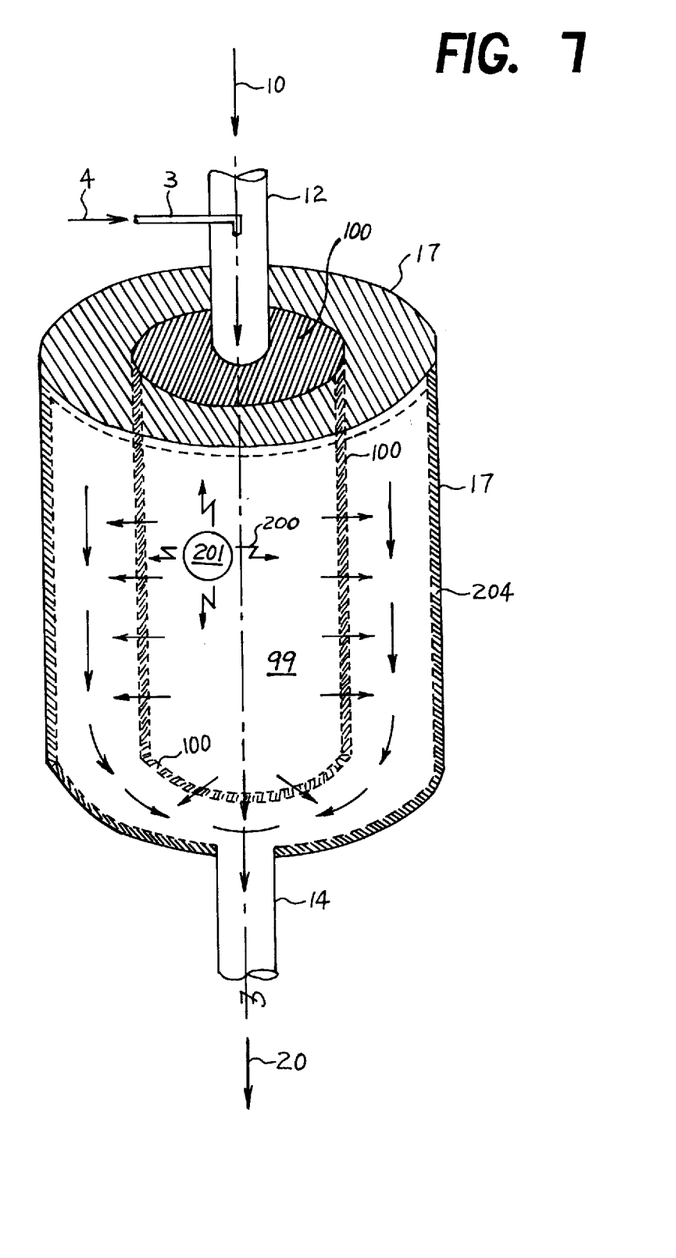
FIG. 7 is a side view of an embodiment with a cylindrical core containing light sources and with the walls of the core being porous photocatalytic semiconductor material.
Figure 8:
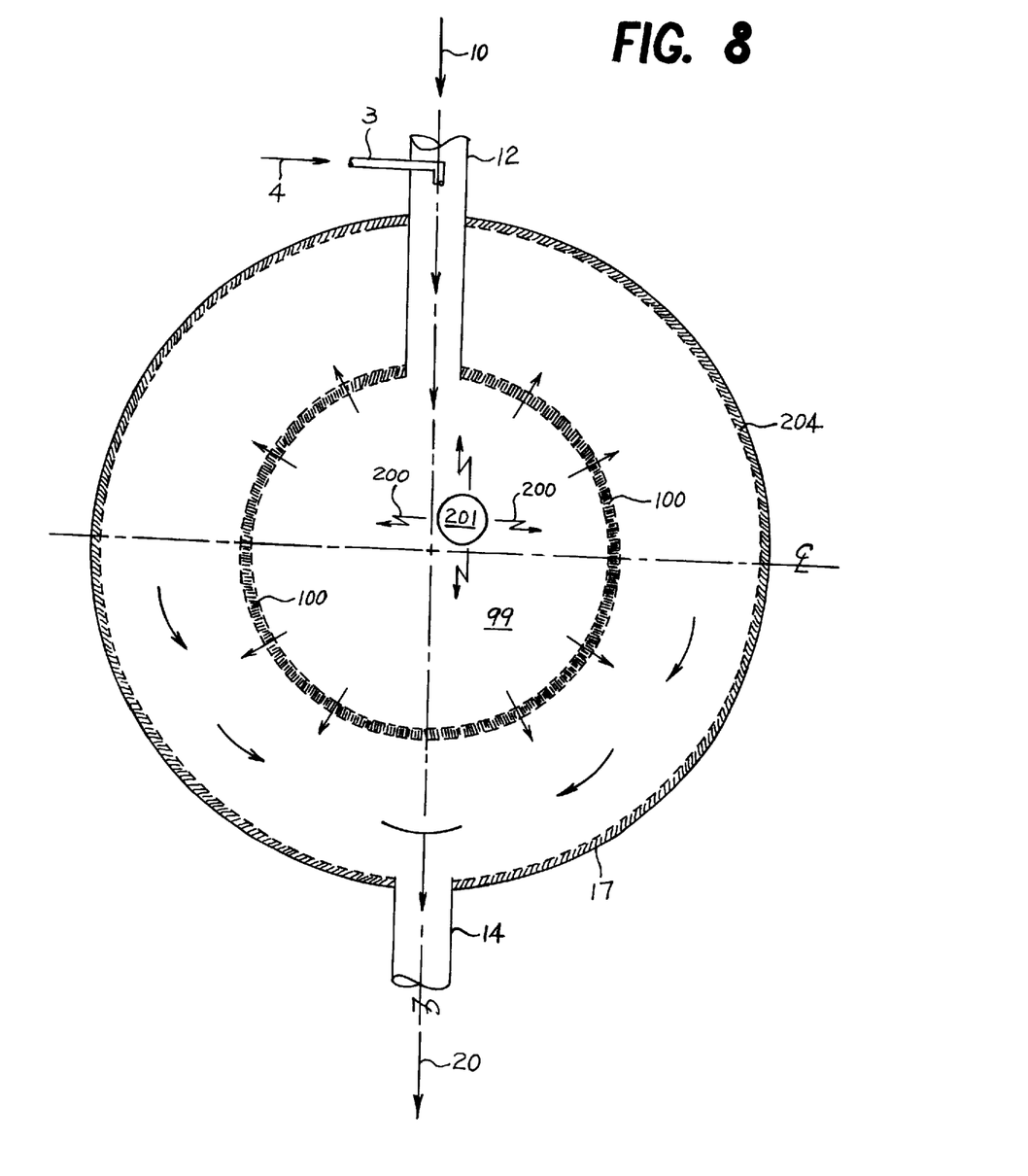
FIG. 8 is a side view of an embodiment with a spherical core containing light sources and with the walls of the core being porous photocatalytic semiconductor material.

FIGS. 7 and 8 show cylindrical and spherical reaction chambers 17, respectively, in which porous photocatalytic semiconductor material form the walls 100 of a core 99 contained within the reaction chamber. As before, the walls 204 of the reaction chamber are transparent. The waste stream 10 enters the core, undergoes photocatalysis and encounters the walls 100 where the separated metal is deposited. Reaction products leave the reaction chamber through the annular region between the walls 204 of the reaction chamber 17 and the walls 100 of the core. In these embodiments, light sources 201 may be contained within the core depending on the thickness of the porous photocatalytic semiconductor walls 100. If these walls are thick, little light from a source external to the reaction chamber 17 would penetrate to the core 99 so that light sources in the core would be needed. For this embodiment, the walls 100 of the core could be connected an external electric potential and an electrode in the core.

Figure 9:
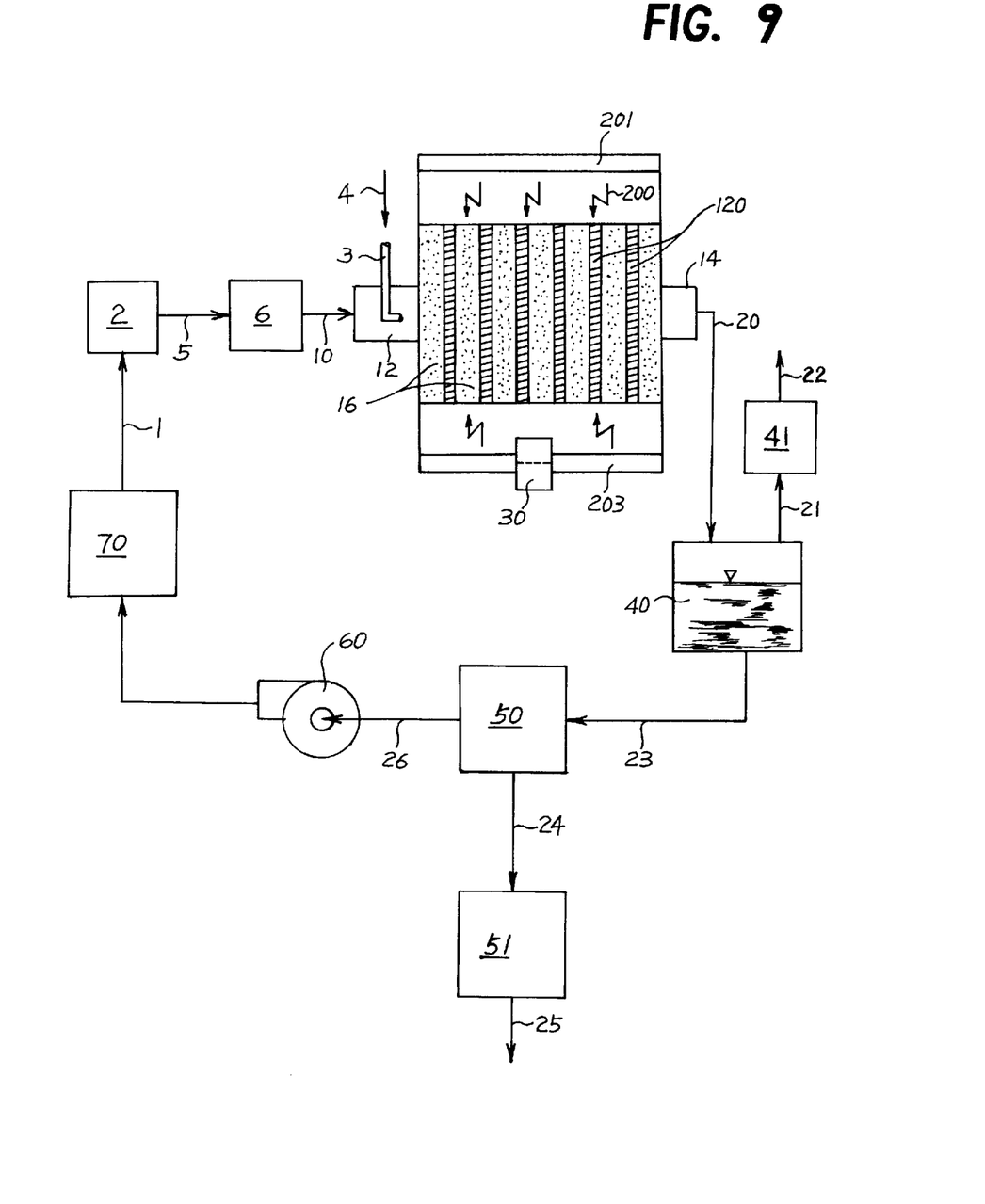
FIG. 9 is a schematic diagram of a process using a photocatalytic reactor to recover silver.

FIG. 9 shows how the present invention could be used in a system to recover silver from a photographic processing solution. This solution is produced during the image creation period. Solution is carried into a wash bath 70 from a fix bath in the photo graphic processing. The waste solution 1 which contains silver thiosulfate ($Ag_2S_2O_3$) passes through a filtration system 2 that filters out the largest metal particles and other trash materials. The filtered solution 5 then enters a pH control system 6 where the acidity and concentration of the solution could be modified to improve reaction rates in the photocatalytic reactor. When entering the photocatalytic reactor, acceptor materials 4 may be added through a pipe 3. The adjusted solution 10, which may contain acceptor material, then enters the reaction chamber where electrons, holes, and radicals established on the surface of the semiconductor attack, destroy, and dissociate the silver thiosulfate. The metallic silver thus produced is deposited onto the metal seeds implanted on the metal mesh 120.

The treated solution 20, which contains mainly $H_2SO_4$ and $H_2O$ and trace amounts of silver thiosulfate, will enter a surge tank 40 after leaving the reactor. This surge tank separates off-gas 21 from the treated solution 20. The resulting liquid 23 is then directed to a separator 50 where $H_2SO_4$ is separated from it. The segregated acid solution 24 then enters an activated carbon bed 51, or ion-exchange resin, for adsorbing any trace amounts of silver thiosulfate that may remain. A pure $H_2SO_4$ solution 25 can be recovered.

Off-gas produced by the catalytic reactions in the reactor and excess acceptor gases 4 are directed to an off-gas purification system 41 for detoxification and purification. A commercially available unit, such as an activated carbon bed or catalytic oxidizer, can be used for off-gas purification. The solution 26, mainly water, from which $H_2SO_4$ has been removed in the separator 50 is recycled back into the wash bath 70 through use of pump 60.

The reactor and reaction chamber need not have any particular shape and as indicated by the embodiments described above, the instant invention is capable of many variations, which will be apparent to those with ordinary skills in the art. Therefore, it is intended that instant invention not be limited to the embodiments described above, but rather include all forms within the scope of the claims that follow.

I claim:

1. A photocatalytic reactor for recovery of metal from metal-laden waste streams comprising:

a reaction chamber with walls that are transparent to light wherein photocatalytic reactions occur;

inlet means to permit entry of a metal-laden waste stream into the reaction chamber and outlet means to permit removal of photocatalytic reaction products;

reactor walls external to the reaction chamber walls with an internal surface;

light sources available to the interior of the reactor walls;

a plurality of porous strata in the reaction chamber, each stratum having a multiplicity of implants of metal seeds, the seeds containing metal in the same metal group in the periodic table as the metal to be removed from the metal-laden waste stream entering the reaction chamber; and means for removing heat from the reactor.

2. A photocatalytic reactor as set forth in claim 1 further comprising means for mixing the metal-laden waste stream with reaction acceptor material from the group consisting of hydrogen peroxide, ozone, oxygen, and air.

3. A photocatalytic reactor as set forth in claim 2 wherein the means for removing heat from the reactor is a heat pipe-cooler system.

4. A photocatalytic reactor as set forth in claim 3 wherein some of the internal surface of the reactor walls are coated with a reflective material.

5. A photocatalytic reactor as set forth in claim 4 wherein the strata with metal seed implants are net meshes made of an electrically conducting metal.

6. A photocatalytic reactor as set forth in claim 4 wherein the porous strata in the reaction chamber are formed of porous metal oxide glass-ceramic.

7. A photocatalytic reactor as set forth in claim 6 wherein each stratum is contained in a frame but does not completely fill the frame and wherein the strata intercept both the waste stream and the light entering the reaction chamber.

8. A photocatalytic reactor as set forth in claim 7 wherein each frame is secured within the reaction chamber by means of a slot fixture.

9. A photocatalytic reactor as set forth in claim 4 wherein the walls of the reactor are a polyhedron-shaped structure encompassing the reaction chamber, the polyhedron-shaped structure having six or more surfaces.

10. A photocatalytic reactor as set forth in claim 2 further comprising an external electric potential and an electrode in the reaction chamber, the strata in the reaction chamber being connected in series to the external electric potential and the electrode.

11. A photocatalytic reactor for recovery of metal from metal-laden industrial waste streams comprising:

a reaction chamber with walls that are transparent to light wherein photocatalytic reactions occur;

a core within the reaction chamber with walls made of a porous photocatalytic semiconductor material with a multiplicity of imbedded metal seeds, the seeds containing metal in the same metal group in the periodic table as the metal to be removed from the metal-laden waste stream entering the reaction chamber;

inlet means to permit entry of a metal-laden waste stream into the reaction chamber and outlet means to permit removal of photocatalytic reaction products;

reactor walls external to the reaction chamber walls with an internal surface;

means for mixing the metal-laden waste stream with reaction acceptor material from the group consisting of hydrogen peroxide, ozone, oxygen, and air;

light sources in the core; and means for removing heat from the reactor.

12. A photocatalytic reactor as set forth in claim 11 wherein the means for removing heat from the reactor is a heat pipe-cooler system.

13. A photocatalytic reactor as set forth in claim 12 wherein the internal surface of the reactor walls are coated with a reflective material.

14. A photocatalytic reactor as set forth in claim 12 wherein the walls of the reactor are a polyhedron-shaped structure encompassing the reaction chamber, the polyhedron-shaped structure having six or more surfaces.

15. A photocatalytic reactor as set forth in claim 12 further comprising an external electric potential and an electrode in the reaction chamber, the walls of the core being connected to the external electric potential and the electrode.

16. A photocatalytic reactor as set forth in claim 5 further comprising metal oxide semiconductor material in the reaction chamber in the form of a slurry.

17. A photocatalytic reactor as set forth in claim 5 further comprising semiconductor material in the reaction chamber in the form of porous glass-ceramic granules.

18. A photocatalytic reactor as set forth in claim 4 wherein the light sources are ultraviolet light sources.

19. A photocatalytic reactor as set forth in claim 12 wherein the light sources are ultraviolet light sources.

\* \* \* \* \*